United States Patent [19]

Niihara

[11] Patent Number: 5,170,259
[45] Date of Patent: Dec. 8, 1992

[54] MOTION COMPENSATED PREDICTIVE CODING/DECODING SYSTEM OF PICTURE SIGNAL

[75] Inventor: Takami Niihara, Yokosuka, Japan

[73] Assignee: Victor Company of Japan, Ltd., Yokohama, Japan

[21] Appl. No.: 766,926

[22] Filed: Sep. 30, 1991

[30] Foreign Application Priority Data

Sep. 29, 1990 [JP] Japan .................. 2-262395

[51] Int. Cl.$^5$ ............................... H04N 7/137
[52] U.S. Cl. .................... 358/133; 358/105; 358/160; 358/135; 358/136
[58] Field of Search ............... 358/133, 105, 160, 135, 358/136

[56] References Cited

U.S. PATENT DOCUMENTS 5,030,953  7/1991  Chiang ........................ 358/105
5,031,037  7/1991  Israelsen ...................... 358/133
5,057,924  10/1991  Yamada ........................ 358/209

Primary Examiner—Howard W. Britton
Attorney, Agent, or Firm—Fleit, Jacobson, Cohn, Price, Holman & Stern

[57] ABSTRACT

A motion compensated predictive coding/decoding system of a picture signal in which one frame is constituted by $N \times M$ pixels. The picture signal is divided into a plurality of block data each have $BH \times BV$ pixels. The plurality of the block data are coded/decoded with motion compensated prediction by processors, the number of which provided in horizontal and vertical directions being K and L respectively. The plurality of the block data to be coded/decoded are supplied to the processors. On the other hand, data of a former frame stored in $K \times a \times L \times b$ memories, each covering $N/K/a \times M/L/b$ pixels. By a bus adapter, connection between the processors and memories is switched in accordance with a block position in the frame to be processed so that the processors can access the memories that store the data required for the motion compensated prediction. Any of the memories is not connected simultaneously to a plurality of the processors.

2 Claims, 11 Drawing Sheets

MOTION COMPENSATED PREDICTIVE CODING/DECODING SYSTEM OF PICTURE SIGNAL

BACKGROUND OF THE INVENTION

This invention relates to a motion compensated predictive coding/decoding system of picture signals suitable for coding/decoding moving pictures.

There is a coding/decoding system for television conference in conventional coding/decoding systems by motion compensated prediction. In this system, a picture to be coded/decoded is constituted by about 352×240 pixels and a motion range in the picture to be motion compensated is ±7 pixels or so horizontally and vertically. When an picture size is small like this, one processor is enough to perform real-time coding/decoding of the picture by compensated prediction.

However, in NTSC (National Television System Committee) system of 704×480 pixels and HDTV (High Definition Television) system of 1920×1080 pixels, it is hard for one processor to coding/decoding a moving picture by motion compensated prediction, due to the capacity of the processor.

Figure 1:
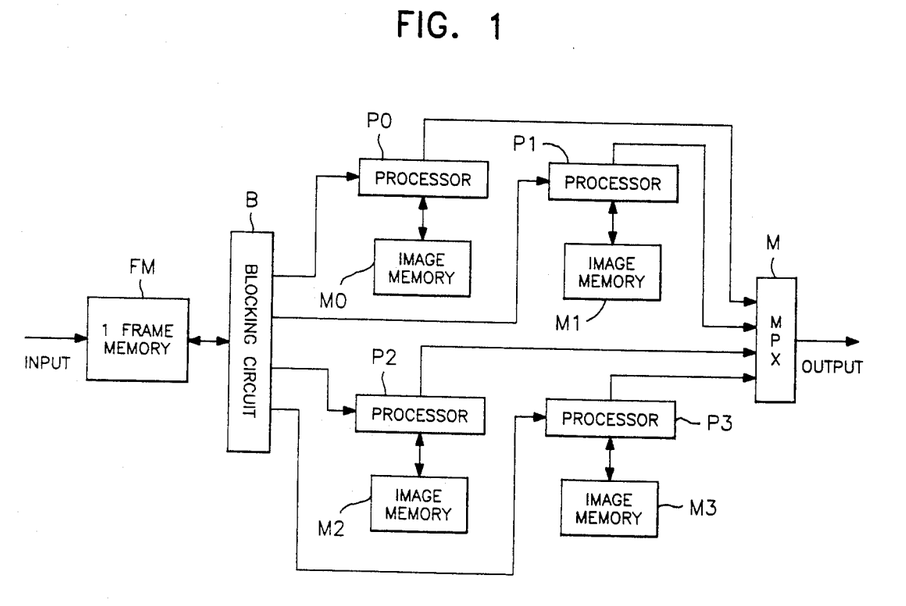
FIG. 1 is a blockdiagram of a conventional motion compensated predictive coding/decoding system.

Therefore, a plurality of processors are employed for coding/decoding a picture of large size. As shown in FIG. 1, a picture supplied to a frame memory FM is divided into block data each having 16×16 pixels by a blocking circuit B. Those block data are supplied to processors P0 to P3 respectively. The processors respectively calculate motion vectors and perform motion compensated predictive coding in parallel using image memories M0 to M3. Coded data are multiplexed by a multiplexer M.

Figure 2A:
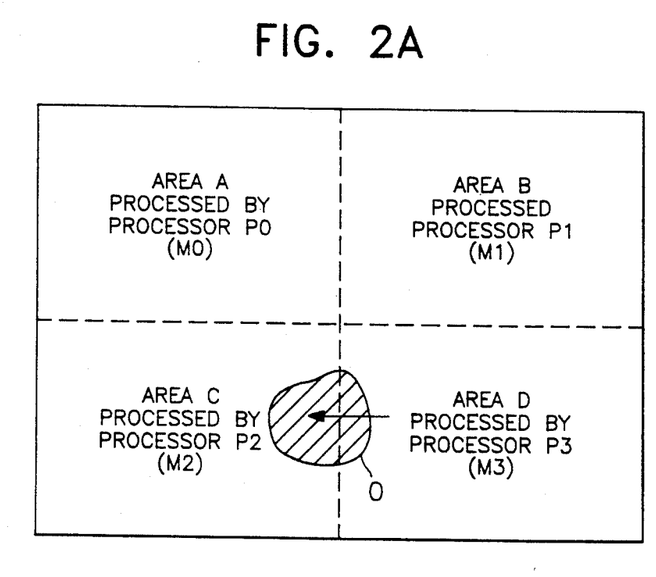
FIGS. 2A and 2B are views explaining drawbacks of the system shown in FIG. 1.
Figure 2B:
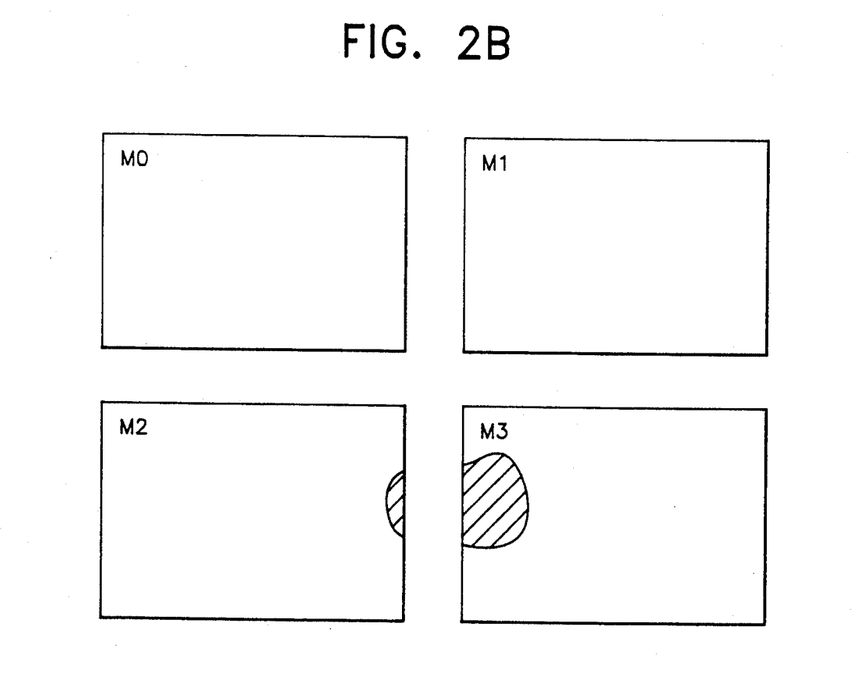

Such system however has drawback as follows. FIGS. 2A and 2B show a frame which is the total area occupied by a picture. Data corresponding to an area A is coded/decoded by the processor P0 with the image memory M0, and so on. When there is an object which is moving across a border between two areas C and D, the processor P2 which only governs the image memory M2 cannot use the data stored in the image memory M3 governed by the processor P3, as a data for motion compensated prediction. This result in discontinuity on the border of the areas processed by the processors P2 and P3 so that a picture displayed on a television is degraded.

SUMMARY OF THE INVENTION

An object of the present invention is to provide a motion compensated predictive coding/decoding system which performs high-speed coding/decoding without causing discontinuity on the border between areas of a frame governed by two processors.

According to the present invention, there is provided a motion compensated predictive coding/decoding system of a picture signal, one frame of which is constituted by N and M pixels in horizontal and vertical directions respectively of the picture.

The system according to the present invention comprises means for dividing data of a frame to be coded/decoded of the picture signal into a plurality of block data each having BH and BV pixels in the horizontal and vertical directions respectively, a plurality of signal processors, the number of which provided in the horizontal and vertical directions being K and L respectively, for coding/decoding the plurality of the block data by motion compensated prediction, at least either of K or L is two or more and K and L being divisors of N and M respectively, a plurality of memory means, each covering N/K/a and M/L/b pixels in the horizontal and vertical directions respectively, for storing data of a frame prior to said frame to be coded/decoded, a and b being natural number greater than 1 and means for switching connection between the signal processors and the memory means in accordance with a block position in the frame to be coded/decoded so that the signal processors can access the memory means that store the data required for the motion compensated prediction, any of the memory means being not connected simultaneously to a plurality of the signal processors.

The other objects and features of the present invention will become understood from the following description with reference to the accompanying drawings.

DETAILED DESCRIPTION OF THE PREFERRED EMBODIMENTS

Figure 3:
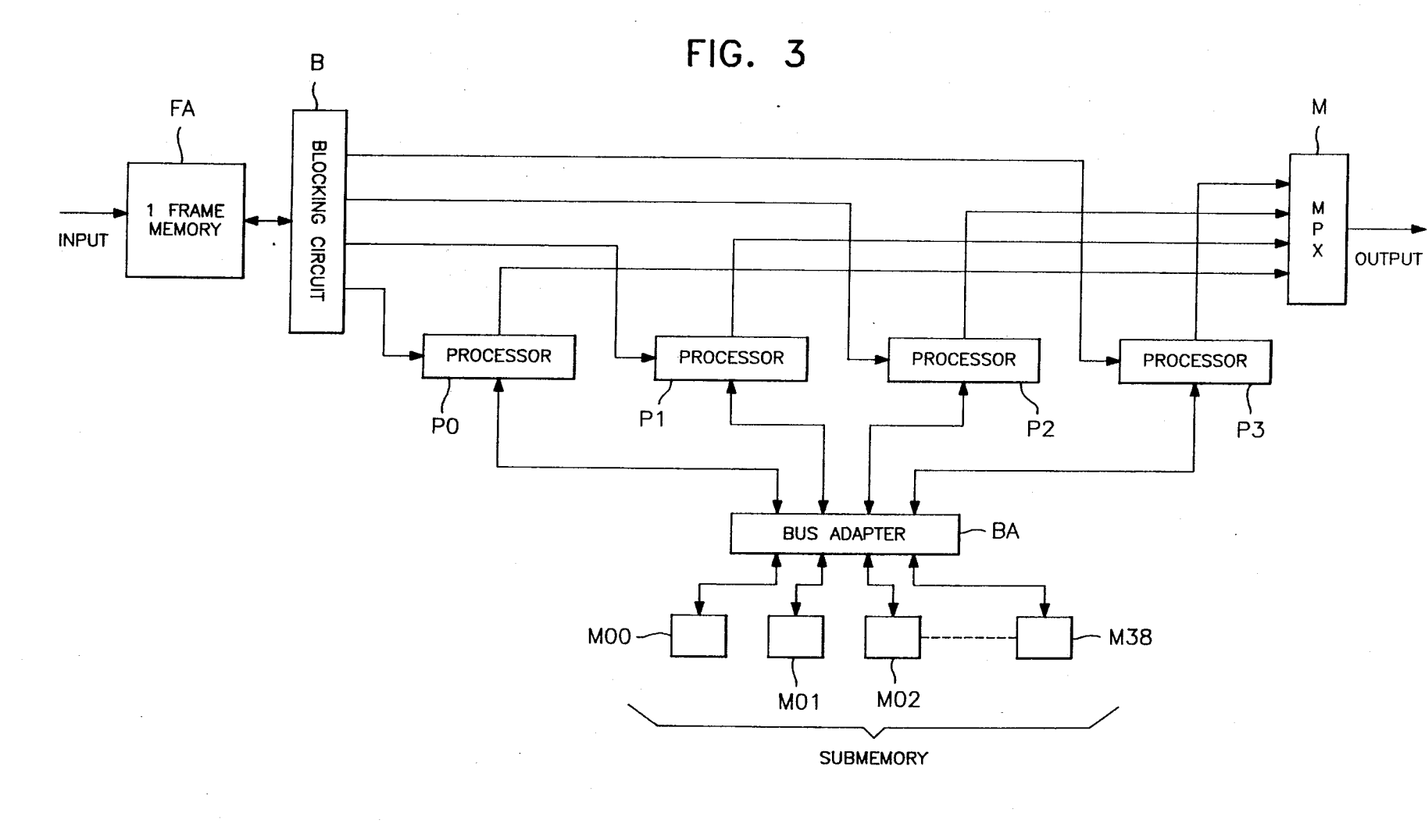
FIG. 3 is a blockdiagram showing a preferred embodiment of the present invention.

FIG. 3 shows a preferred embodiment of a motion compensated predictive coding system according to the present invention.

When parallel processing of the motion compensated predictive coding is carried out by a plurality of processors Pi (i=0 to 3), each of image memories Mi (not shown and i=0 to 3) is not governed by only one of the processors. Image memories M0 to M3 are divided into submemories Mi0 to Mi8. A bus adapter BA is provided between the processors and submemories to connect each of the processors and some of the submemories corresponding to a block data which is to be coded by that processor.

Accordingly, this system is to maintain continuity on the border between two areas of a frame such as shown in FIG. 2A by motion compensated prediction using data stored in any image memory.

Electrical connection and operation of components in FIG. 3 are the same as of FIG. 1, except those of the processors and submemories.

Figure 4:
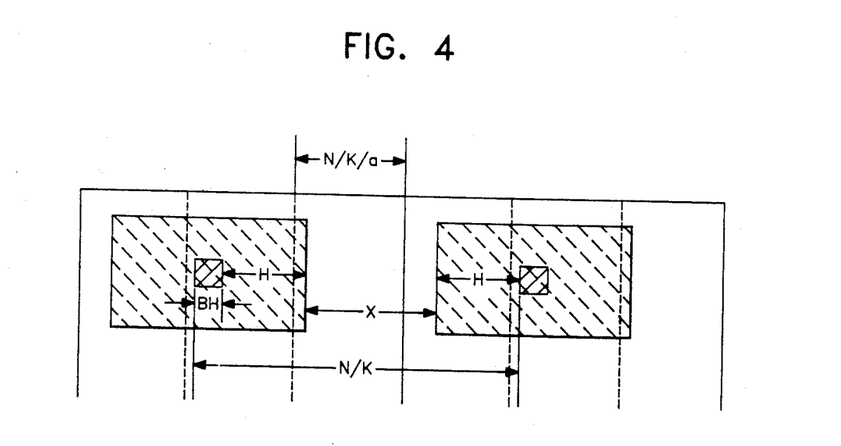
FIG. 4 is a view explaining block data transferred between processors and submemories of the system shown in FIG. 3.

FIG. 4 shows locations of two block data at one moment depicted by slanted lines and data areas of a former frame required for motion compensated processing of each of the block data depicted by slanted dot lines.

The motion compensated processing of the present invention at one moment is carried out on a plurality of block data of the same block number by the processors Pi respectively. Therefore, for example, the relationship between two block data each of which is to be processed by processors being next to each other and the data (stored in the submemories Mi0 to Mi8) of a former frame required for the processing is as shown in FIG. 4.

It is required that, no matter how the location of the block data (block number) to be processed is changed, the respective data areas each required by each of the processors being next to each other are not covered by the same submemories.

In order to fulfill that requirement, in FIG. 4, X width of space of data areas each required by each of the processors being next to each other is made equal to width of a submemory N/K/a or more, that is, since $X = N/K - (2H + BH)$ so that $N/K - (2H + BH) \geq N/K/a$ Therefore, the following relationship is established.

$$N/K/a \geq 2H/(a-1) + BH/(a-1) \qquad (1)$$

where, N is the number of horizontal pixels of one frame, K is the number of processors in horizontal, H is the number of pixels in a horizontal motion compensation range, BH is the number of pixels in a block data to be processed by horizontal motion compensated prediction and a is the number of submemories in horizontal.

What is mentioned in above is the same for a vertical direction. Therefore, the following relationship is also established.

$$M/L/b \geq 2V/(b-1) + BV/(b-1) \qquad (2)$$

where, M is the number of vertical pixels of one frame, L is the number of processors in vertical, V is the number of pixels in a vertical motion compensation range, BV is the number of pixels in a block data to be processed by vertical motion compensated prediction and b is the number of submemories in vertical.

The following is an explanation of the case where the system in FIG. 3 comprises three submemories both in horizontal and vertical for one image memory governed by a processor under the condition of ±63 pixels in both horizontal and vertical in a motion compensation range and 16 pixels in both horizontal and vertical of a block data to be processed with motion compensated prediction on a picture PI constituted by 1920×1152 pixels.

From (1) and (2), $1920/K/3 \geq 63 + 16/2$ then $K \leq 1920/3/63 \doteq 9$ and $1152/L/3 \geq 63 + 16/2$ then $L \leq 1152/3/63 \doteq 5$.

Hence, the number of processors K in horizontal is 2 which is smaller than 9 and is a divisor of the horizontal pixels 1920 of the picture PI and the number of processors L in vertical is also 2 which is smaller than 5 and is a divisor of the vertical pixels 1152 of the picture PI. Accordingly, four processors in total in which two in both horizontal and vertical are enough to carry out motion compensated predictive coding.

As shown in FIG. 5 and FIGS. 6A to 6I, each image memory Mi (i=0 to 3) governed by each processor Pi has 960×576 pixels, because 1920/2=960 and 1152/2=576. The image memory Mi is divided into submemories Mi0 to Mi8 each having 320×192 pixels (because 960/3=320 and 576/3=192) which is larger than the motion compensation range (63 pixels).

Figure 5:
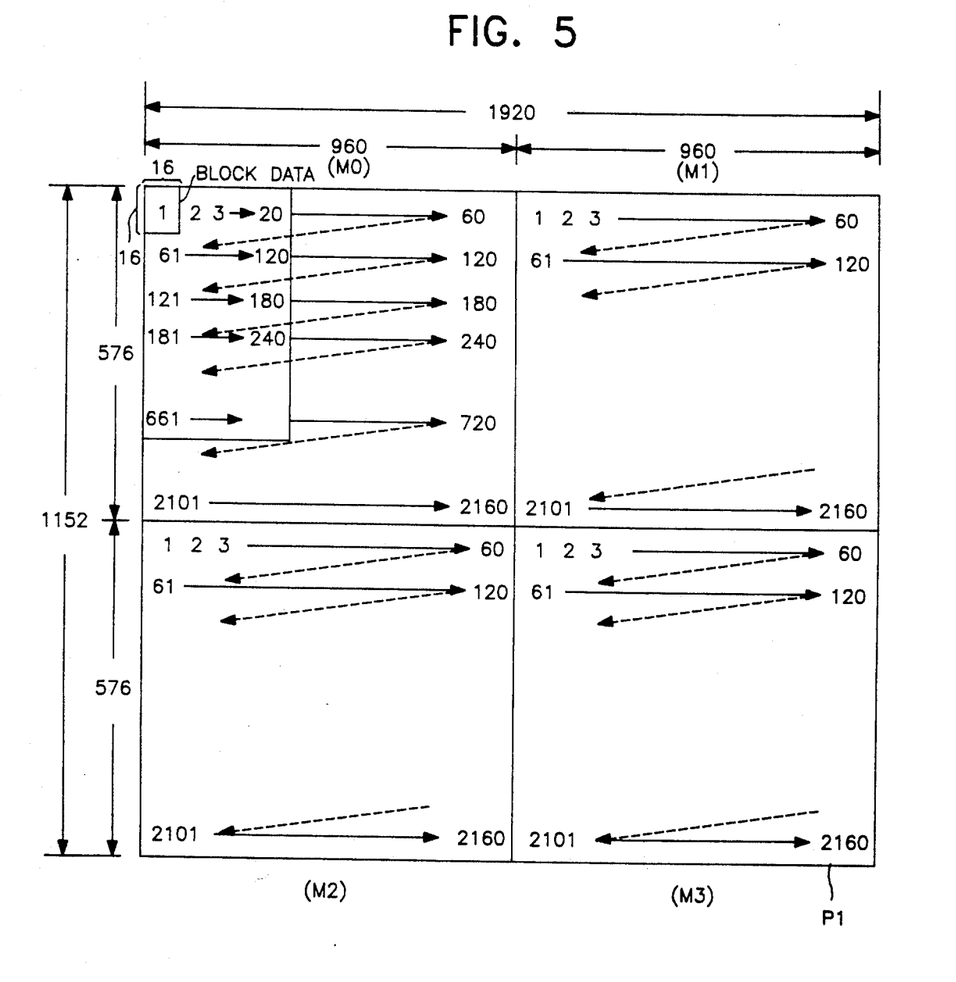
FIG. 5 is a view explaining image memories with respect to the system shown in FIG. 3.

After being stored in the frame memory FA in FIG. 3, a picture is divided into a plurality of block data (each block data has 16×16 pixels) by the blocking circuit B. Then, the divided block data are supplied to the processors Pi respectively in order of block numbers 1, 2, ..., 2160 as shown in FIG. 5. One of the processors Pi accesses a submemory Mij in which a former data (not necessarily just before) through the bus adapter BA and obtains the data therefrom for motion compensated predictive coding and then performs the coding. In this case, the first four block data (block number 1 in M0, M1, M2 and M3 in FIG. 5) are supplied to the processors P0 to P3 almost simultaneously. After the processing on those block data are performed in parallel, the processing on the second, the third, ..., the 2160th four block data are performed in order. This means that the processors P0 to P3 always process block data of the same block number at any moment.

Figure 6A:
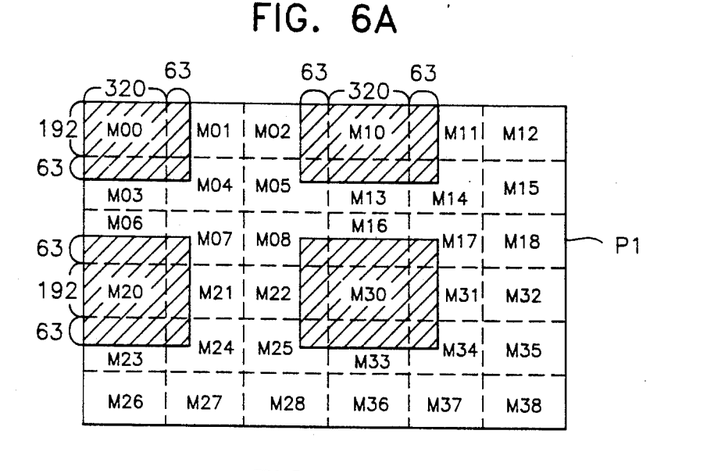
FIG. 6A to 6I are views explaining the submemories.
Figure 6B:
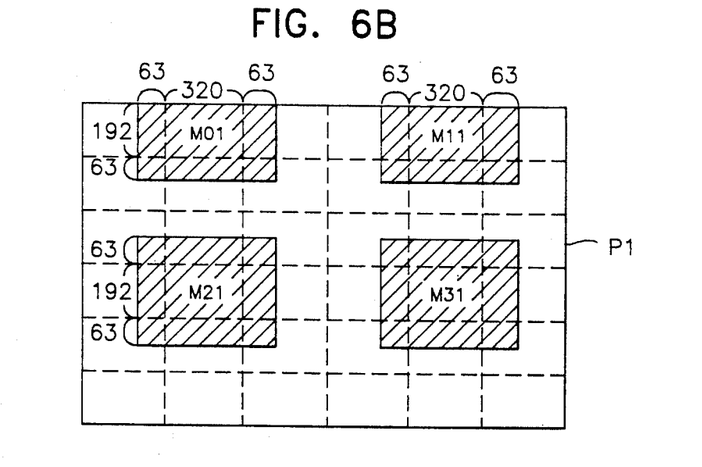
Figure 6C:
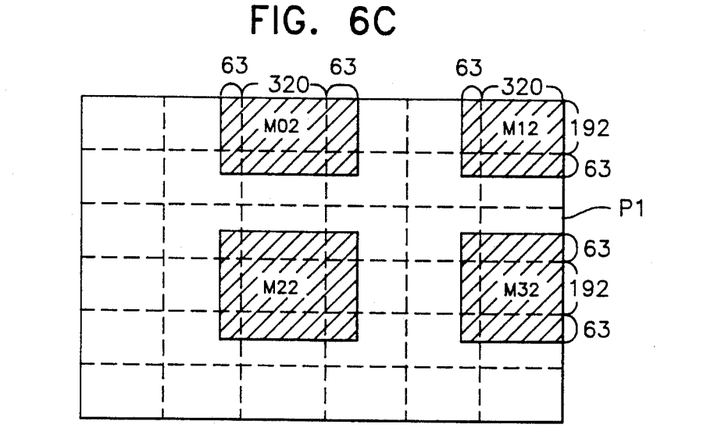
Figure 6D:
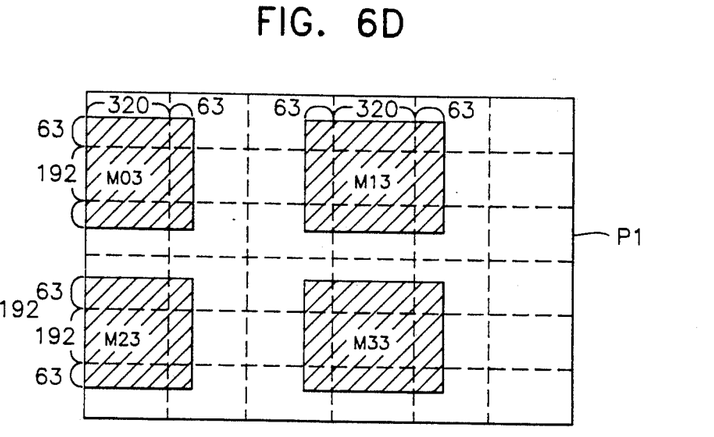
Figure 6E:
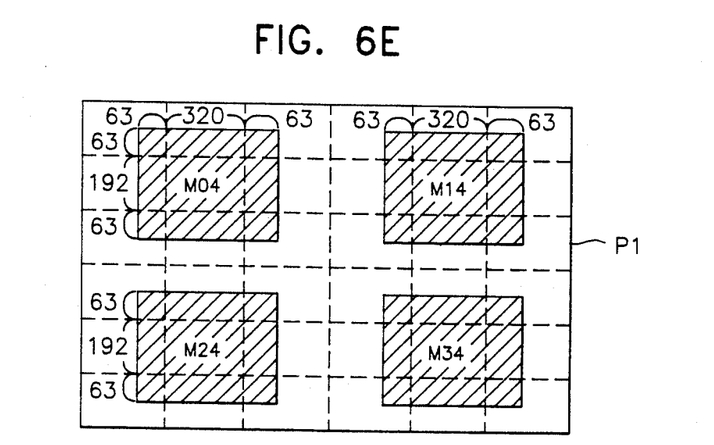
Figure 6F:
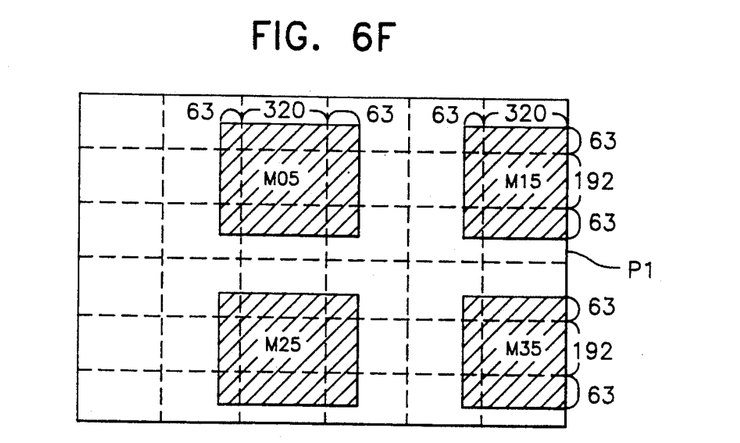
Figure 6G:
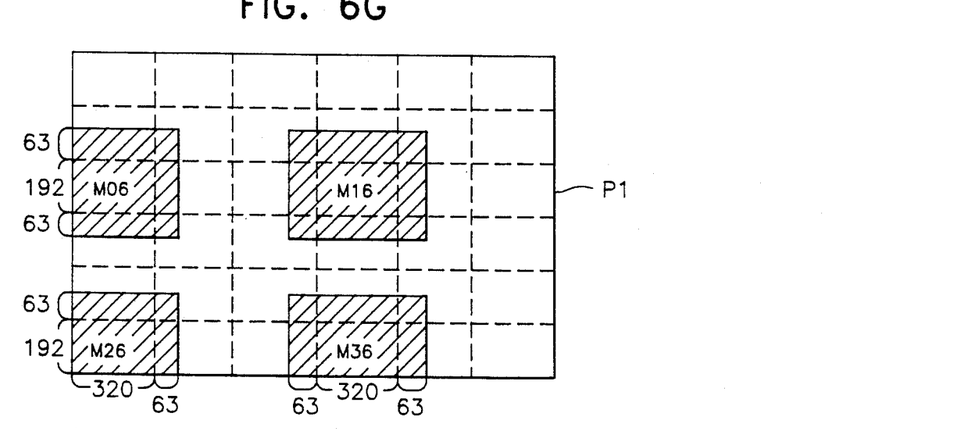
Figure 6H:
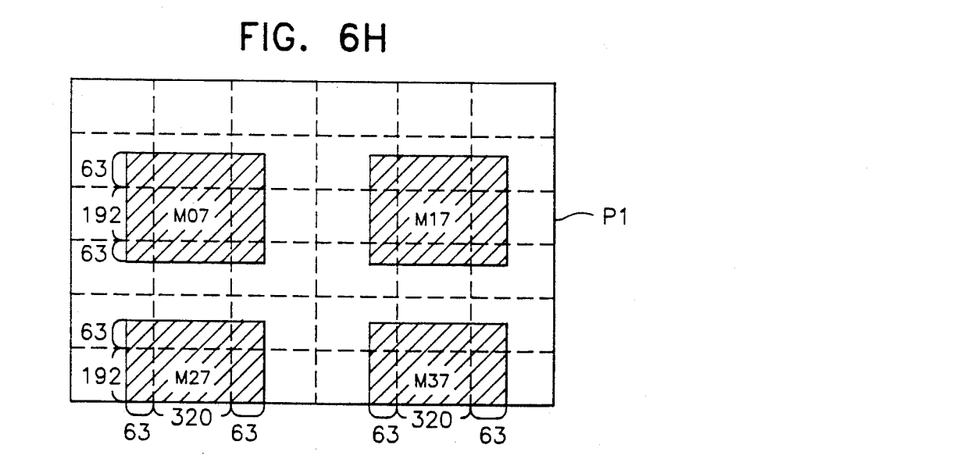
Figure 6I:
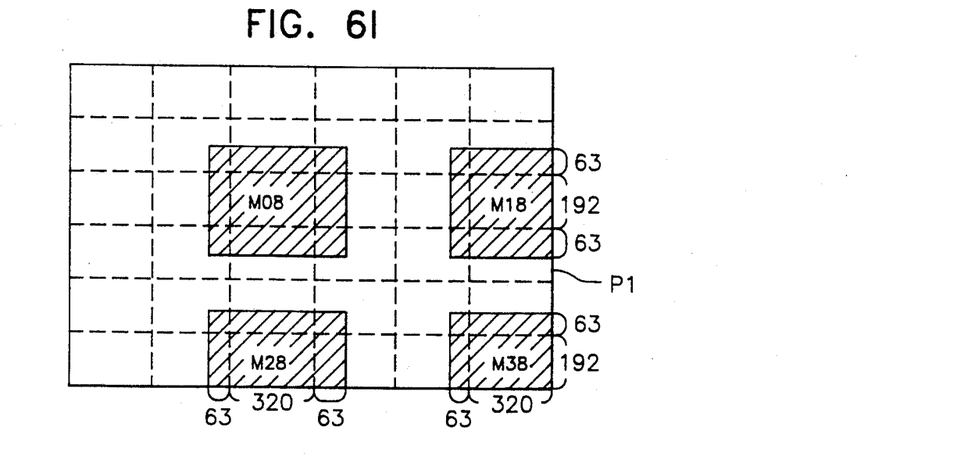

FIG. 6A shows the locations of supplied block data which are the locations of the submemories Mi0. Since motion compensation range has 63 pixels and the submemory has 320×192 pixels, the areas which might be accessed for detection of motion vector and motion compensated prediction are, (320+63)×(192+63) pixels by the processor P0
(320+63×2)×(192+63) pixels by the processor P1 (320+63)×(192+63×2) pixels by the processor P2 and (320+63×2)×(192+63×2) pixels by the processor P3, which are the areas depicted by slanted lines in and around M00, M10, M20 and M30 shown in FIG. 6A.

Figure 7A:
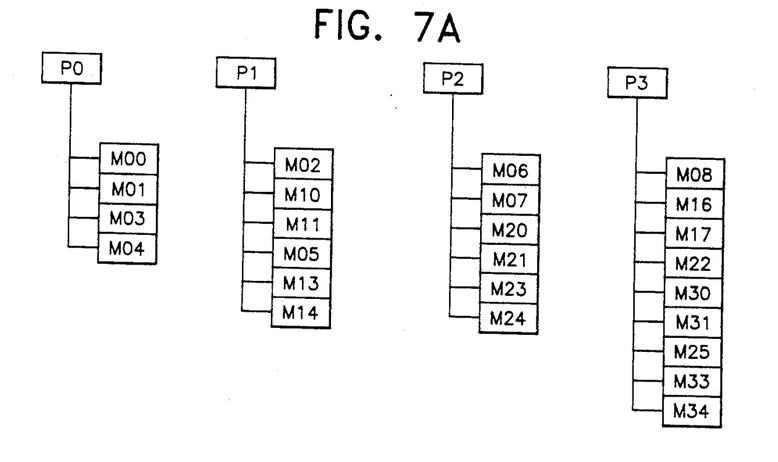
FIG. 7A to 7I are views explaining connection relationship between the processors and submemories.
Figure 7B:
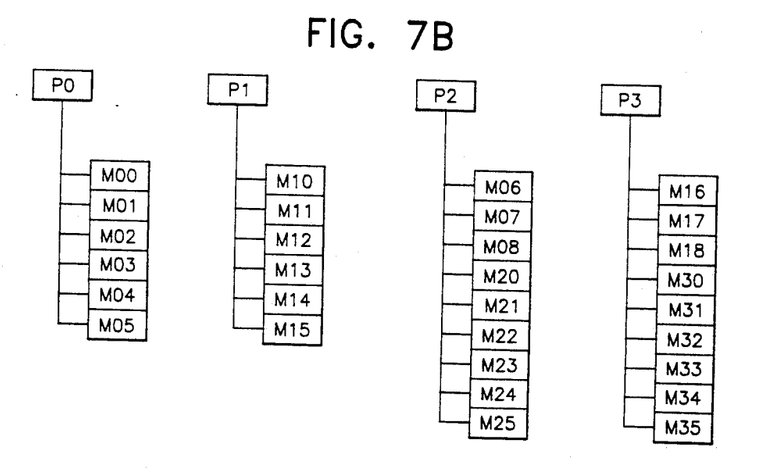
Figure 7C:
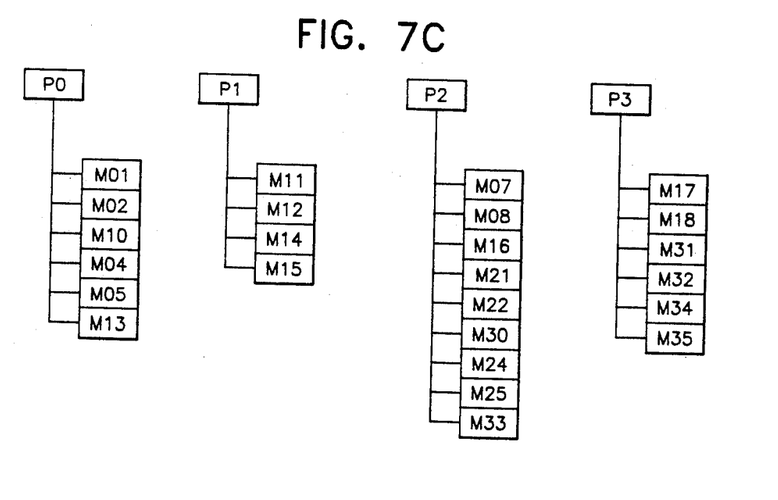
Figure 7D:
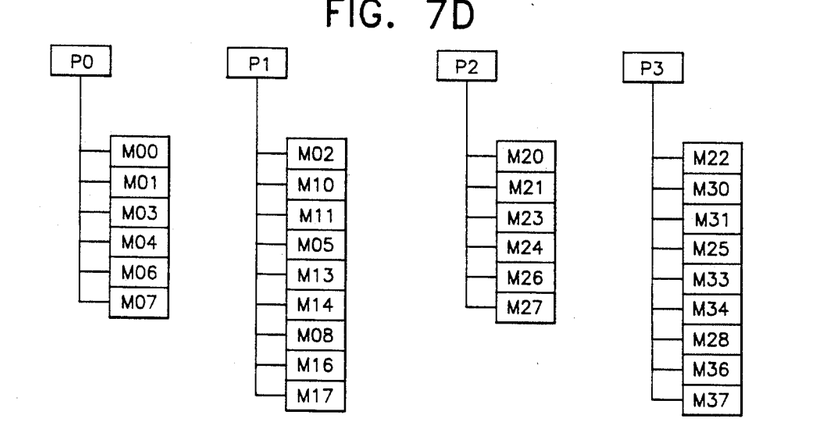
Figure 7E:
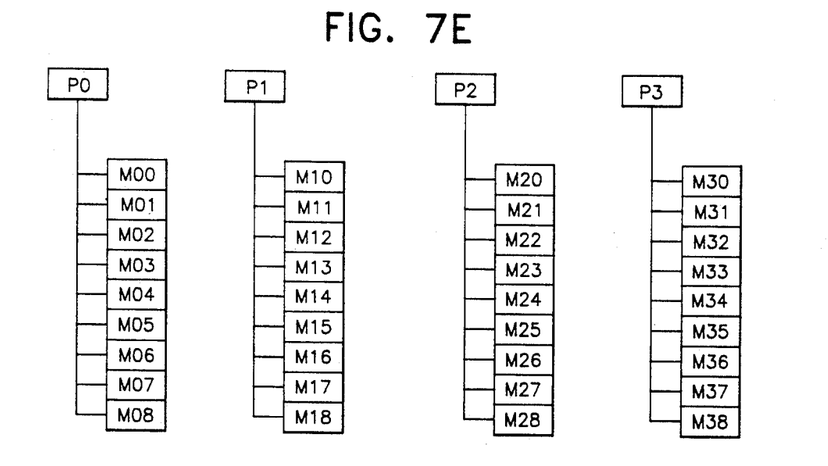
Figure 7F:
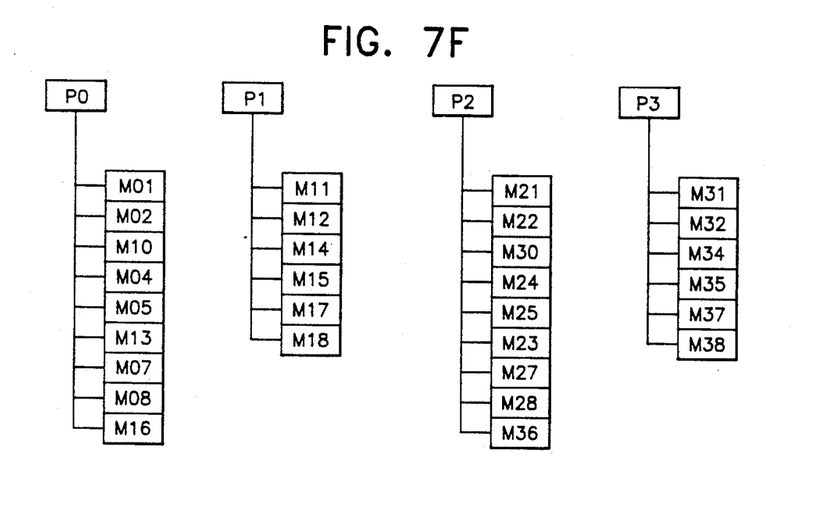
Figure 7G:
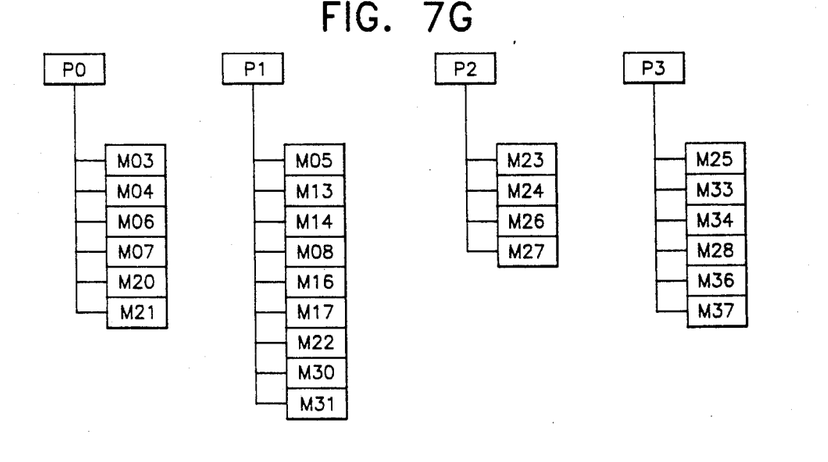
Figure 7H:
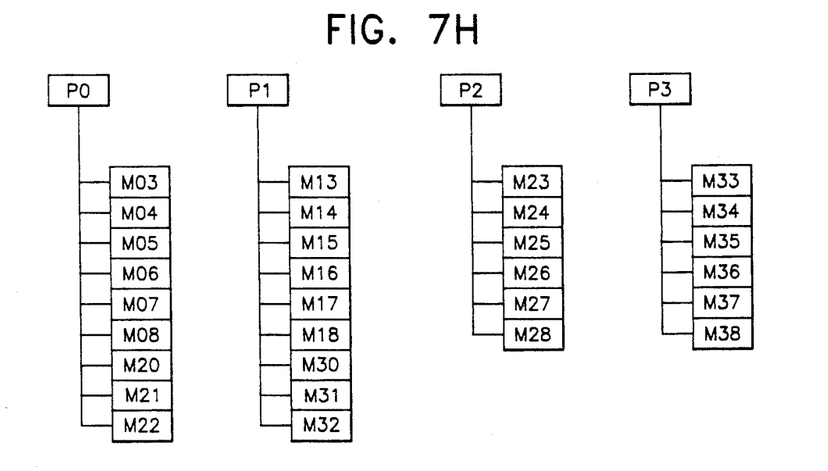
Figure 7I:
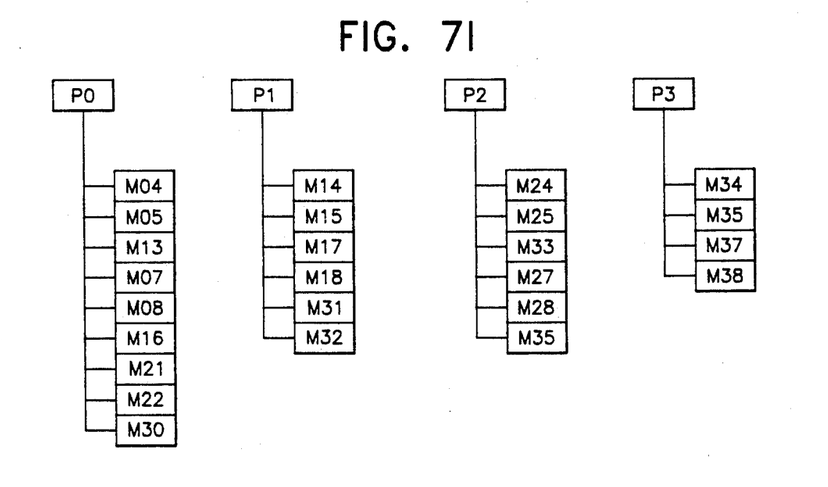

In this case, the submemories Mi0 to Mi8 are connected to the processors Pi (i=0 to 3) through the bus adapter BA as shown in FIG. 7A. Accordingly, there is no submemory which might be simultaneously accessed by different processors.

The left upper portion of FIG. 6A is explained. Depicted by slanted lines is the area of all data which are required for processing all block data (the block numbers 1 to 20, 61 to 80, 121 to 140, 181 to 200,...., 661 to 680 in FIG. 5) included in the area stored in the submemory M00. Therefore, if the processor P0 can access the submemories M00, M01, M03 and M04 which are covered by slanted lines, any block data included in the area of the submemory M00 can be processed. As shown in FIG. 7A, the processor P0 is connected to the submemories M00, M01, M03 and M04.

Next all portions of FIG. 6A is explained. Since, processing to the same block numbers are made by the processors P0 to P3 in parallel, while the processor P0 processes the block data included in the area of the submemory M00, the processors P1 to P3 process the block data included in the areas of the submemories M10, M20 and M30, respectively.

In this case, eleven submemories (M12, M15, M18, M32, M35, M38, M26, M27, M28, M36 and M37) located in the right end and lower end portions in FIG. 6A are not covered by slanted lines so that they are not connected to any processor in FIG. 7A.

The same as above, when the locations of block data are on submemories Mij (j=1 to 8), the submemories which might be accessed for motion compensated prediction are determined as shown in FIGS. 6B to 6I and FIGS. 7B to 7I. Accordingly, there is no submemories which might be simultaneously accessed by different processors.

FIGS. 7A to 7I show the submemories connected to the processors P0 to P3 under the status shown in FIGS. 6A to 6I respectively. The submemories which are connected to no processor are not shown in FIGS. 7A to 7I.

While in processing shown in FIGS. 6A to 6I, the bus adapter BA shown in FIG. 3 connects the processors and the submemories as shown in FIGS. 7A to 7I. Owing to this, a processor can access another area (corresponding to image memory) governed by another processor, to perform motion compensated predictive coding.

Figure 8:
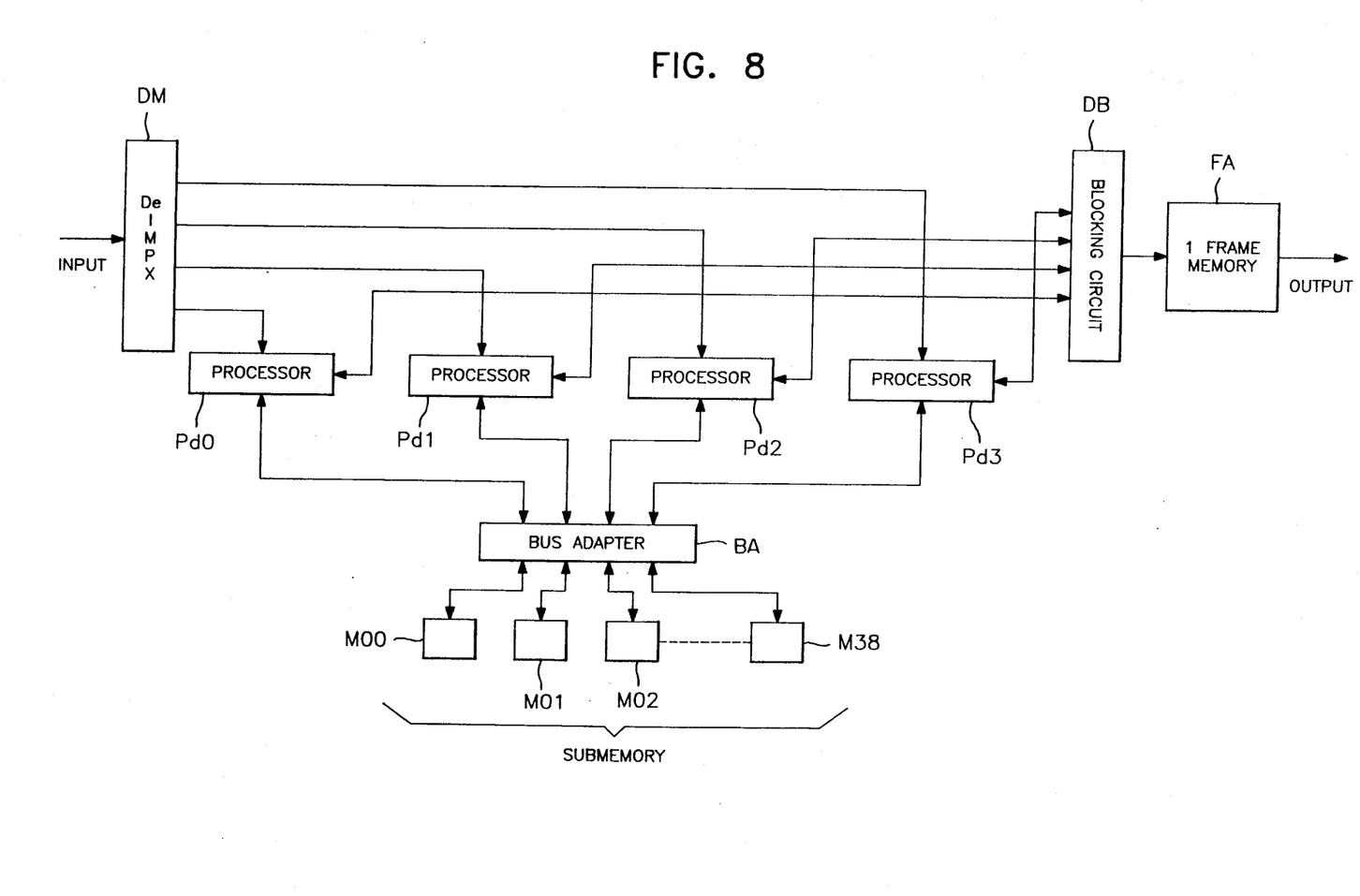
FIG. 8 is a blockdiagram showing another preferred embodiment of the present invention.

FIG. 8 shows a preferred embodiment of a motion compensated predictive decoding system according to the present invention.

The coded data output from the system shown in FIG. 3 is divided by a demultiplexer DM. Divided data are applied to a plurality of processors Pdi (i=0 to 3) for decoding in which the divided data are processed in parallel.

By means of a bus adapter BA provided between the processors Pdi and submemories Mi0 to Mi8, the submemories corresponding to the block data to be processed by a processor are connected thereto. Decoded data are converted to a picture signal by a deblocking circuit DB and is outputted through a frame memory FA.

As disclosed above, the motion compensated predictive coding/decoding system according to the present invention comprises a plurality of processors, a plurality of submemories corresponding to image memories each governed by a processor and a bus adapter which switches connection of the processors and submemories in accordance with locations of block data to be processed so that different processors do not simultaneously access the same submemory.

As a result, high-speed motion compensated predictive coding/decoding is accomplished and there is no discontinuity on the border of areas each governed by a processor so that a picture displayed on a television is not degraded.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. A motion compensated predictive coding/decoding system of a picture signal, one frame of which is constituted by N and M pixels in horizontal and vertical directions respectively of the picture, comprising:
   means for dividing data of a frame to be coded/decoded of the picture signal into a plurality of block data each having BH and BV pixels in the horizontal and vertical directions respectively;
   a plurality of signal processors, the number of which provided in the horizontal and vertical directions being K and L respectively, for coding/decoding the plurality of the block data by motion compensated prediction, at least either of K or L is two or more and K and L being divisors of N and M respectively;
   a plurality of memory means, each covering N/K/a and M/L/b pixels in the horizontal and vertical directions respectively, for storing data of a frame prior to said frame to be coded/decoded, a and b being natural number greater than 1; and
   means for switching connection between the signal processors and the memory means in accordance with a block position in the frame to be coded/decoded so that the signal processors can access the memory means that store the data required for the motion compensated prediction, any of the memory means being not connected simultaneously to a plurality of the signal processors.

2. A motion compensated predictive coding/decoding system according to claim 1, wherein the followings are established:

$$N/K/a \geq 2H/(a-1) + BH/(a-1) \text{ and}$$

$$M/L/b \geq 2V/(b-1) + BV/(b-1)$$

where H and V are the numbers of pixels of a motion compensation range in the horizontal and vertical directions respectively.

* * * * *